(12) United States Patent
Shimoda

(10) Patent No.: US 8,169,499 B2
(45) Date of Patent: May 1, 2012

(54) SOLID-STATE IMAGE PICK-UP DEVICE, DATA TRANSMISSION METHOD, AND IMAGE PICKUP APPARATUS

(75) Inventor: Tetsuya Shimoda, Tokyo (JP)

(73) Assignee: Sony Corporation, Tokyo (JP)

(*) Notice: Subject to any disclaimer, the term of this patent is extended or adjusted under 35 U.S.C. 154(b) by 360 days.

(21) Appl. No.: 12/305,198

(22) PCT Filed: Jun. 26, 2007

(86) PCT No.: PCT/JP2007/062783
§ 371 (c)(1),
(2), (4) Date: Aug. 12, 2009

(87) PCT Pub. No.: WO2008/001760
PCT Pub. Date: Jan. 3, 2008

(65) Prior Publication Data
US 2010/0026814 A1    Feb. 4, 2010

(30) Foreign Application Priority Data
Jun. 30, 2006   (JP) .................................. 2006-182030

(51) Int. Cl.
*H04N 5/228* (2006.01)

(52) U.S. Cl. ...................... 348/222.1; 348/300; 348/301; 348/308; 257/232

(58) Field of Classification Search ............... 348/222.1, 348/294, 300, 301, 308, 207.1; 257/232; 250/214; 341/144, 155
See application file for complete search history.

(56) References Cited

U.S. PATENT DOCUMENTS

| | | | |
|---|---|---|---|
| 5,457,494 A * | 10/1995 | Suga et al. ................. | 348/229.1 |
| 5,929,905 A * | 7/1999 | Kanda et al. ............... | 348/222.1 |
| 7,639,296 B2 * | 12/2009 | Mabuchi ....................... | 348/308 |
| 2005/0062864 A1 * | 3/2005 | Mabuchi ....................... | 348/294 |
| 2005/0083420 A1 | 4/2005 | Koseki et al. | |
| 2006/0176201 A1 * | 8/2006 | Kimura et al. ............... | 341/144 |

FOREIGN PATENT DOCUMENTS

| | | |
|---|---|---|
| JP | 09-322077 | 12/1997 |
| JP | 2005-86224 | 3/2005 |
| JP | 2005-244709 A | 9/2005 |

OTHER PUBLICATIONS

European Patent Office Search Report for counterpart application No. EP 07767589.0, dated Mar. 25, 2011 (6 pages).
International Preliminary Report on Patentability and Written Opinion of the International Search Authority for International Application No. PCT/JP2007/062783, mailed Jan. 29, 2009, 6 pages.

* cited by examiner

*Primary Examiner* — Tuan Ho
*Assistant Examiner* — Kent Wang
(74) *Attorney, Agent, or Firm* — Finnegan, Henderson, Farabow, Garrett & Dunner, L.L.P.

(57) ABSTRACT

A video camera (100) for transmitting image data from an image pickup device to an image processing device with reduced electric power includes a C-MOS image sensor (110) that reads captured image data on the basis of a reference clock CLK0, a frequency multiplying circuit (121) that generates a high-speed clock CLK1, a rearranging circuit (122) that transposes the captured image data into bit data sequences, a data output section (120) that causes each data transmitter (124) to sequentially transmit a corresponding bit data sequence to the outside on the basis of the high-speed clock CLK1, and a system controller (400) that drives data transmitters (124), the number of which is proportional to a transmission speed.

7 Claims, 8 Drawing Sheets

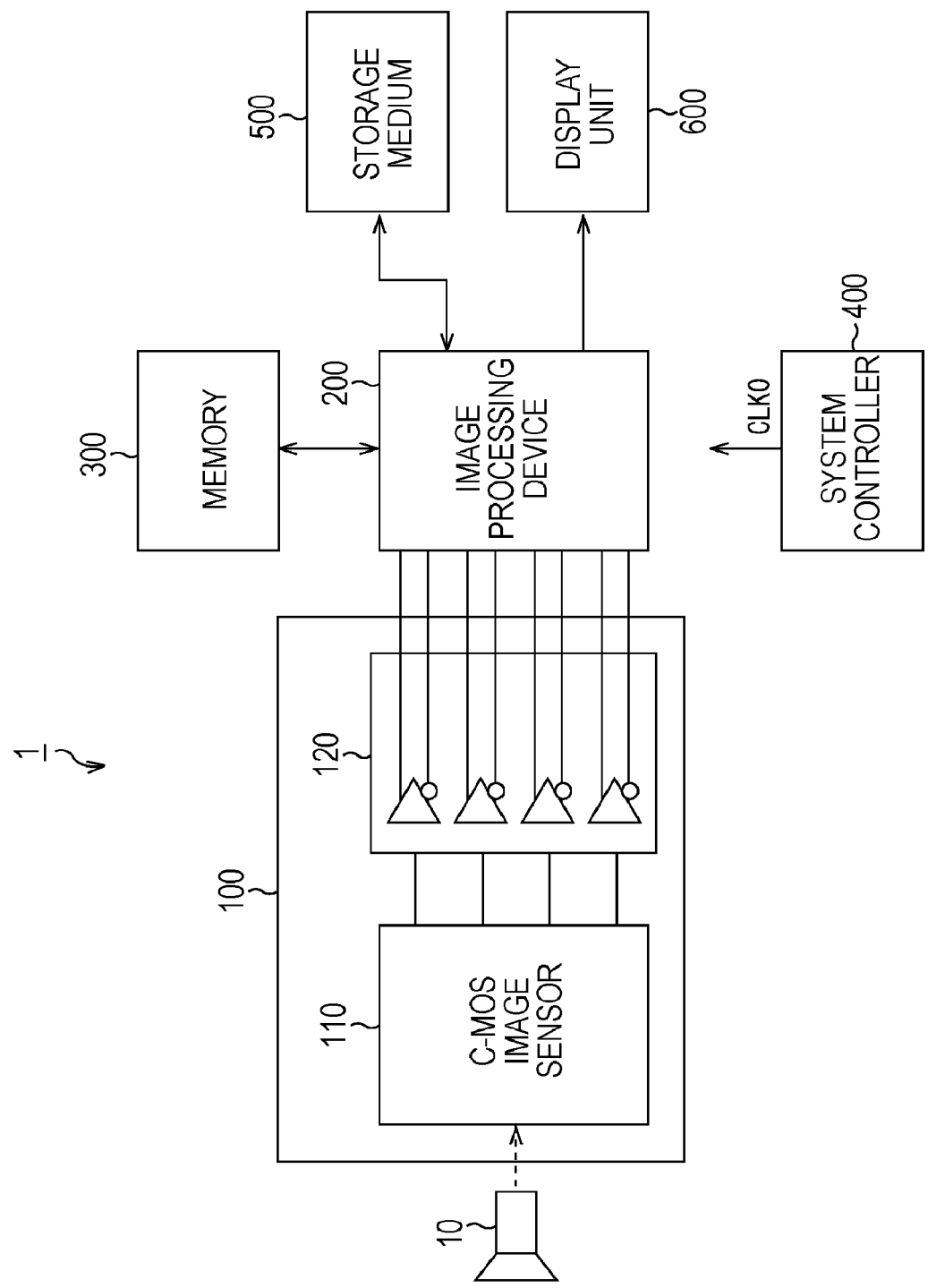

FIG. 2A

| Mode | Word Length | The Number of Channels Used | Pixel Rate | bit Rate/ch | Operating Frequency of Reference Clock |
|---|---|---|---|---|---|
| | bit | | [M Pixle/s] | [M bps] | [MHz] |
| Still-Image Recording | 10 | 10 | 432 | 432 | 108 |
| HD Moving-Image Recording | 10 | 10 | 108 | 108 | 27 |
| SD Moving-Image Recording | 10 | 10 | 54 | 54 | 13.5 |
| Monitoring | 10 | 10 | 27 | 27 | 6.75 |

FIG. 2B

| Mode | Word Length | The Number of Channels Used | Pixel Rate | bit Rate/ch | Operating Frequency of Reference Clock |
|---|---|---|---|---|---|
| | bit | | [M Pixle/s] | [M bps] | [MHz] |
| Still-Image Recording | 10 | 10 | 432 | 432 | 108.0 |
| HD Moving-Image Recording | 10 | 5 | 108 | 216 | 27.0 |
| SD Moving-Image Recording | 10 | 2 | 54 | 270 | 13.5 |
| Monitoring | 10 | 1 | 27 | 270 | 6.75 |

| Channel 10 | D1[10] | D2[10] | D3[10] | D4[10] |
| --- | --- | --- | --- | --- |
| Channel 9 | D1[9] | D2[9] | D3[9] | D4[9] |
| Channel 8 | D1[8] | D2[8] | D3[8] | D4[8] |
| Channel 7 | D1[7] | D2[7] | D3[7] | D4[7] |
| Channel 6 | D1[6] | D2[6] | D3[6] | D4[6] |
| Channel 5 | D1[5] | D2[5] | D3[5] | D4[5] |
| Channel 4 | D1[4] | D2[4] | D3[4] | D4[4] |
| Channel 3 | D1[3] | D2[3] | D3[3] | D4[3] |
| Channel 2 | D1[2] | D2[2] | D3[2] | D4[2] |
| Channel 1 | D1[1] | D2[1] | D3[1] | D4[1] |

| Channel 5 | D1[9] | D1[10] | D2[9] | D2[10] | D3[9] | D3[10] | D4[9] | D4[10] |
|---|---|---|---|---|---|---|---|---|
| Channel 4 | D1[7] | D1[8] | D2[7] | D2[8] | D3[7] | D3[8] | D4[7] | D4[8] |
| Channel 3 | D1[5] | D1[6] | D2[5] | D2[6] | D3[5] | D3[6] | D4[5] | D4[6] |
| Channel 2 | D1[3] | D1[4] | D2[3] | D2[4] | D3[3] | D3[4] | D4[3] | D4[4] |
| Channel 1 | D1[1] | D1[2] | D2[1] | D2[2] | D3[1] | D3[2] | D4[1] | D4[2] |

FIG. 8A

| Channel 10 | D1[10] | D2[10] | D3[10] | D4[10] |
|---|---|---|---|---|
| Channel 9 | D1[9] | D2[9] | D3[9] | D4[9] |
| Channel 8 | D1[8] | D2[8] | D3[8] | D4[8] |
| Channel 7 | D1[7] | D2[7] | D3[7] | D4[7] |
| Channel 6 | D1[6] | D2[6] | D3[6] | D4[6] |
| Channel 5 | D1[5] | D2[5] | D3[5] | D4[5] |
| Channel 4 | D1[4] | D2[4] | D3[4] | D4[4] |
| Channel 3 | D1[3] | D2[3] | D3[3] | D4[3] |
| Channel 2 | D1[2] | D2[2] | D3[2] | D4[2] |
| Channel 1 | D1[1] | D2[1] | D3[1] | D4[1] |

CLK1, 2

FIG. 8B

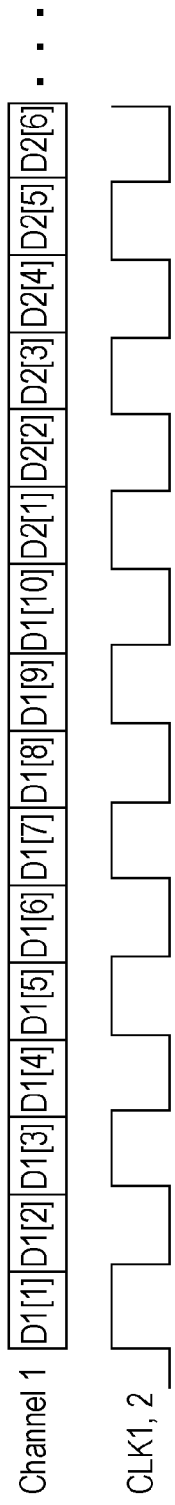
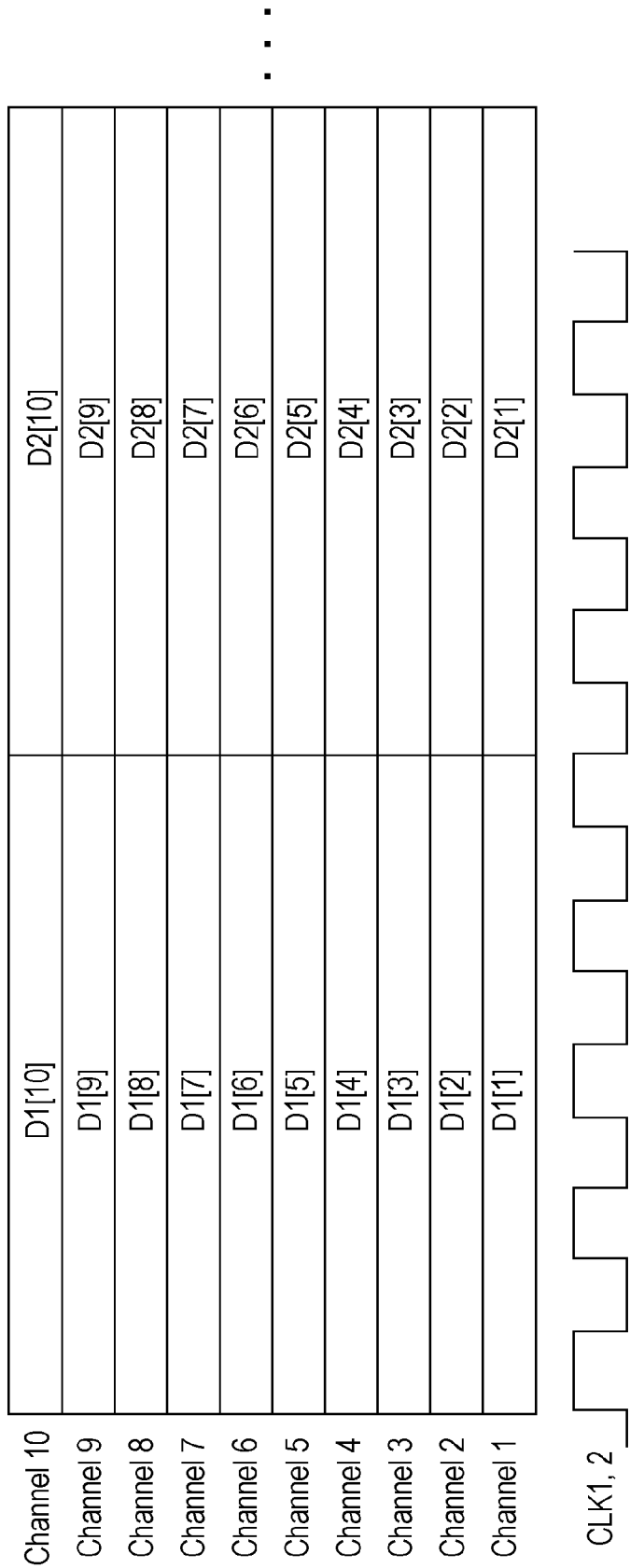
FIG. 9A
FIG. 9B

SOLID-STATE IMAGE PICK-UP DEVICE, DATA TRANSMISSION METHOD, AND IMAGE PICKUP APPARATUS

TECHNICAL FIELD

The present invention relates to a solid-state image pickup device and a data transmission method for reading captured image data from a solid-state image pickup element such as a C-MOS-type image sensor and transmitting the captured image data, and further relates to an image pickup apparatus employing a solid-state image pickup element such as a C-MOS-type image sensor.

The present application claims priority from Japanese Patent Application No. 2006-182030 filed Jun. 30, 2006, the content of which is hereby incorporated by reference into this application.

BACKGROUND ART

In recent years, image sensors based on C-MOS-type semiconductor manufacturing processes (hereinafter, referred to as C-MOS image sensors) have been widely put into practical use. A C-MOS image sensor can sequentially read pixel signals acquired from individual unit pixels 21 that are arranged two-dimensionally in, for example, m columns×n rows. Specifically, in the C-MOS image sensor, m column signal lines for transmitting pixel signals generated from n unit pixels 21 arranged in a vertical direction (referred to as a column direction) and n horizontal selection lines for selecting m unit pixels 21 arranged in a horizontal direction are arranged in a grid-like manner. The C-MOS image sensor is an image pickup device for sequentially scanning, on a one-by-one basis, the unit pixels 21 of m columns and n rows via these column signal lines and horizontal selection lines to generate image signals.

In order to capture, with the use of such an image pickup device, high-quality images based on, for example, full HD (Full High Definition) standards or the like, it is required to output more pixel data items per unit time from the C-MOS image sensor. Thus, the C-MOS image sensor needs to output pixel data items at a higher pixel rate. In the case of capturing image signals at a high pixel rate as described above, in order to achieve output to the outside at a transmission rate similar to a conventional transmission rate, the number of output terminals of the image pickup device needs to be increased. Thus, there is a problem in which the circuit scale is increased.

In order to solve such a problem, an idea of increasing the reading speed of pixel data items from the individual unit pixels 21 in the C-MOS image sensor and outputting image signals read at a high speed to the outside through a small number of output terminals can be considered. Here, in a case where the reading speed of pixel signals from the individual unit pixels 21 is simply increased, the electric power consumption within the C-MOS image sensor and noise generated during reading are increased.

In order to reduce the negative effects brought about by such an increase in the reading speed, a solid-state image pickup device for generating a high-speed clock from a low-speed clock, reading pixel data items for four pixels from a C-MOS image sensor on the basis of the low-speed clock, and outputting the pixel data items through a plurality of differential transmission channels to the outside on the basis of the high-speed clock is suggested in Japanese Unexamined Patent Application Publication No. 2005-86224.

In the solid-state image pickup device suggested in Patent Document 1 described above, the C-MOS image sensor is operated on the basis of the low-speed clock and an output-side circuit for outputting pixel data items is operated on the basis of the high-speed clock. Thus, compared with a case where all the processing blocks in the entire device are operated at high speed, a reduction in noise generated within the C-MOS image sensor and suppression of the increase in the electric power consumption can be achieved.

DISCLOSURE OF INVENTION

Technical Problem

The solid-state image pickup device described in Patent Document 1 described above performs transmission of image signals by driving differential amplifiers, the number of which is the same as that in a case where image data with a high resolution and a high frame rate is transmitted, even in a case where image signals in a low-resolution and low-framerate data format are captured and transmitted. Thus, compared with a solid-state image pickup device that performs all the processing operations from reading of pixel signals to outputting of image signals to the outside on the basis of the number of clocks at a relatively low frequency, the electric power consumption is increased.

A technical object of the present invention is suggested in view of the above-described current circumstances and is to provide a solid-state image pickup device, a data transmission method, and an image pickup apparatus for transmitting captured image data read from a solid-state image pickup element to the outside of the solid-state image pickup element with reduced electric power.

An embodiment of a solid-state image pickup device according to the present invention includes a solid-state image pickup element that reads, on the basis of a first clock, captured image data items from unit pixels that are arranged two-dimensionally; a second clock generation unit that generates a second clock having an operating frequency higher than that of the first clock; an arrangement processing unit that rearranges the captured image data items read from the solid-state image pickup element into bit data sequences; a data transmission unit that includes a plurality of differential amplifiers for transmitting the bit data sequences rearranged by the arrangement processing unit through a plurality of differential transmission channels to the outside, the differential amplifiers transmitting the bit data sequences to the outside on the basis of the second clock; and a control unit that drives differential amplifiers, the number of which is proportional to a transmission speed at which the captured image data items are transmitted to the outside.

In addition, an embodiment of a data transmission method according to the present invention for outputting, through a plurality of differential transmission channels to the outside, captured image data items read from a solid-state image pickup element in which unit pixels are arranged two-dimensionally includes rearranging the captured image data items read from the solid-state image pickup element into a predetermined number of bit data sequences; generating a second clock having an operating frequency higher than that of the first clock; driving differential amplifiers, the number of which is proportional to a transmission speed at which the captured image data items are transmitted to the outside; and transmitting, for the individual driven differential amplifiers, each of the rearranged bit data sequences to the outside on the basis of the second clock.

Furthermore, an embodiment of an image pickup apparatus according to the present invention includes an image pickup processing section that reads, on the basis of a first clock, captured image data items from a solid-state image pickup element in which unit pixels are arranged two-dimensionally, and an image processing section that performs predetermined data processing on the captured image data items read from the image pickup processing section. The image pickup processing section includes a second clock generation unit that generates a second clock having an operating frequency higher than that of the first clock; an arrangement processing unit that rearranges the captured image data items read from the solid-state image pickup element into a predetermined number of bit data sequences; a data transmission unit that includes a plurality of differential amplifiers for transmitting the bit data sequences rearranged by the arrangement processing unit through a plurality of differential transmission channels to the outside, the differential amplifiers transmitting the bit data sequences to the outside on the basis of the second clock; and a control unit that drives differential amplifiers, the number of which is proportional to a transmission speed at which the captured image data items are transmitted to the image processing section.

The present invention operates the solid-state image pickup element on the basis of the first clock and operates an output-side circuit for outputting pixel data on the basis of the second clock having a high frequency. Thus, in the present invention, since more captured image data items are output per unit time without increasing the speed of the operation for the captured image data items by the solid-state image pickup element, noise generated inside the solid-state image pickup element can be reduced in a case where data having a high image quality is output.

In addition, in the present invention, differential amplifiers, the number of which is proportional to the transmission speed at which the captured image data items are transmitted to the outside, are driven, and the individual bit data sequences are transmitted to the outside by the driven differential amplifiers on the basis of the second clock.

As described above, in the present invention, since captured image data items are transmitted through differential transmission channels to the outside, unnecessary radiation occurring at the time when data is transmitted can be reduced. In addition, since a minimum necessary number of differential amplifiers are driven in accordance with the image quality of image data, captured image data can be transmitted with reduced electric power, irrespective of the image quality of captured image data to be transmitted.

Further technical objects of the present invention and specific advantages achieved by the present invention will become more apparent from the embodiments described below with reference to the drawings.

BRIEF DESCRIPTION OF DRAWINGS

FIG. 1 is a block diagram schematically showing the configuration of a video camera 1.

FIGS. 2A and 2B are illustrations showing operations inside video cameras changing in accordance with an image pickup mode.

FIGS. 8A and 8B are illustrations showing differential transmission processing for bit data in an HD moving-image recording mode.

FIGS. 9A and 9B are illustrations showing differential transmission processing for bit data in a monitoring mode.

BEST MODE FOR CARRYING OUT THE INVENTION

Figure 3:
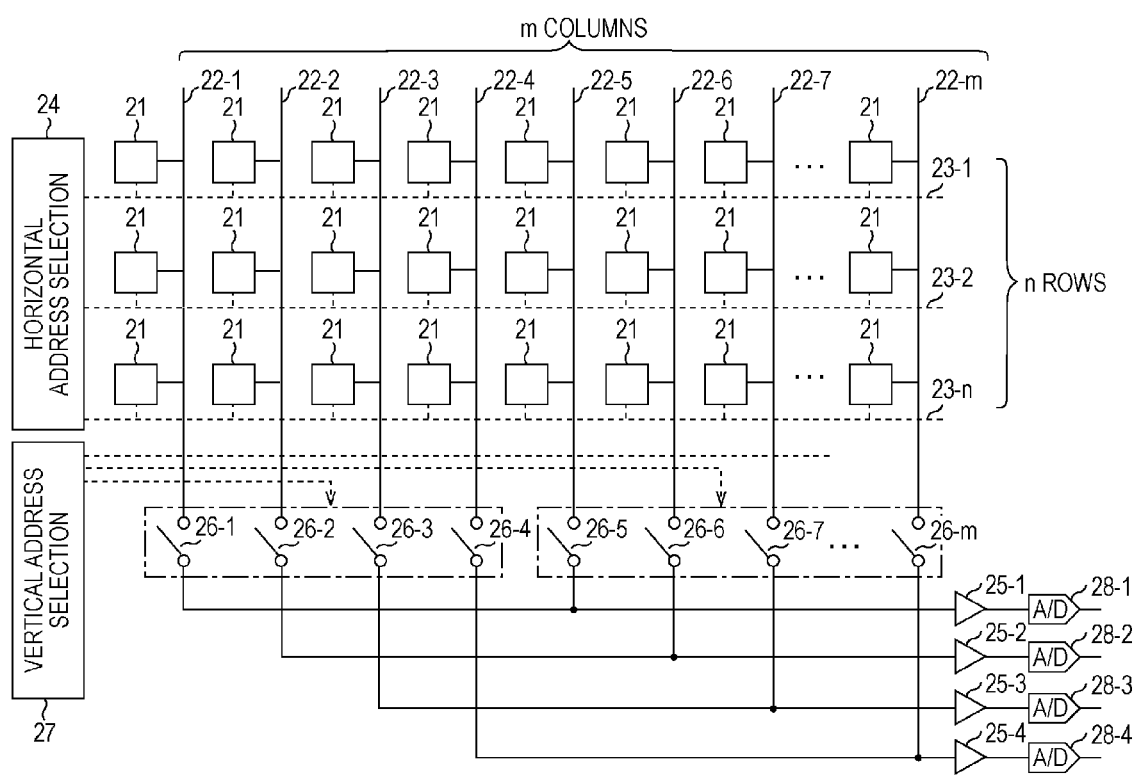
FIG. 3 is an illustration showing a circuit board of a C-MOS image sensor.

Hereinafter, best modes for carrying out the present invention will be described in detail with reference to the drawings. In the embodiments described below, the present invention is applied, for example, to an image pickup apparatus (hereinafter, simply referred to as a video camera 1) for capturing an image of a subject by using a solid-state image pickup element.

The video camera 1 includes, as shown in FIG. 1, a lens unit 10, an image pickup device 100 constituted by a C-MOS (Complementary Metal Oxide Semiconductor) image sensor 110 and a data output section 120, an image processing device 200, a memory 300, a system controller 400, a storage medium 500, and a display unit 600.

In the lens unit 10, a focus lens, a zoom lens, a diaphragm, and a driving part for driving these lenses are provided. In addition, the lens unit 10 receives light of a subject image to form the image on a light-receiving surface of the C-MOS image sensor 110.

The image pickup device 100 is constituted by the C-MOS image sensor 110, which receives light of a subject image to generate captured image data, and the data output section 120, which outputs the captured image data generated by the C-MOS image sensor 110 to the image processing device 200.

The C-MOS image sensor 110 has unit pixels 21 that are arranged two-dimensionally on the light-receiving surface thereof, and each of the unit pixels 21 performs photoelectric conversion of focused light to output an electric signal. Then, the C-MOS image sensor 110 reads an electric signal from each of the unit pixels 21 and converts the read electric signal into, for example, a pixel data item of 10 bits. In addition, the C-MOS image sensor 110 includes amplifiers for realizing four parallel outputs of electric signals in column lines. That is, the C-MOS image sensor 110 outputs four parallel pixel data items per unit time.

The data output section 120 includes output terminals for a total of ten channels for outputting bit data in a serial format. The data output section 120 transposes four parallel pixel data items output from the C-MOS image sensor 110 into bit data sequences in a serial format, and the bit data sequences in the serial format are output from individual channels. That is, the image pickup device 100 transmits, from the data output section 120 to the image processing device 200, captured image data items as bit data sequences in the serial format.

The image processing device 200 rearranges bit data sequences in the serial format supplied from the image pickup device 100 into pixel data items in units of pixels. Furthermore, the image processing device 200 arranges pixel data items two-dimensionally to generate image data for each screen, and supplies the generated image data to the memory 300 so that the image data is stored in the memory 300.

In addition, the image processing device 200 reads image data temporarily stored in the memory 300, performs adjustment, such as gamma correction and white balance control, on the read image data, and converts the data format of the image data into a format for a storage medium, a display, or the like. Furthermore, the image processing device 200 supplies the image data to the storage medium 500 and the display unit 600. As described above, image data captured by the video camera 1 is stored in the storage medium 500, such as, for example, a hard disk or a flash memory, and is displayed on the display unit 600 constituted by an LCD (Liquid Crystal Display), organic EL (Electroluminescence), or the like.

The system controller 400 supplies a reference clock CLK0 to each device of the video camera 1. Note that as shown in FIGS. 2A and 2B, the reference clock CLK0 changes its operating frequency in accordance with an image pickup mode. Specifically, the system controller 400 generates a reference clock CLK0 having a high operating frequency in a case where the pixel rate of image data is fast and generates a reference clock CLK0 having a low operating frequency in a case where the pixel rate of image data captured is slow.

In addition, the system controller 400 controls these processing units. In particular, in the video camera 1 according to this embodiment, the system controller 400 supplies, to the data output section 120, a control instruction corresponding to an image pickup mode selected at the time when an image of a subject is captured, and switches the number of channels for output terminals to be used in the data output section 120.

Here, in this embodiment, for example, there are a total of four types of image pickup modes, which are determined by classification according to the pixel rate (M Pixel/s). That is, these image pickup modes are a still-image recording mode (432 [M Pixel/s]), an HD (High Definition) moving-image recording mode (108 [M Pixel/s]), an SD (Standard Definition) moving-image recording mode (54 [M Pixel/s]), and a monitoring mode (27 [M Pixel/s]) in the descending order of the number of pixel data items (pixels) supplied per unit time from the image pickup device 100 to the image processing device 200.

In a conventional video camera, as shown in FIG. 2A, a processing unit corresponding to the data output section always uses output terminals of a total of ten channels, irrespective of the image pickup mode. Thus, in the conventional video camera, the bit rate per channel changes according to the image pickup mode.

Meanwhile, in the video camera 1 according to this embodiment, as shown in FIG. 2B, the system controller 400 changes, according to the image pickup mode, the number of channels for output terminals to be used in the data output section 120.

In this embodiment, the configurations of the image pickup device 100 and the image processing device 200 are described in detail while processing for selecting the number of channels to be used for the output terminals described above is focused on.

First, the configuration of the C-MOS image sensor 110 will be described with reference to FIG. 3.

The C-MOS image sensor 110 includes, as shown in FIG. 3, the plurality of unit pixels 21 that are arranged two-dimensionally in m columns×n rows and m column signal lines (22-1, 22-2, ..., 22-m) for transmitting electric signals output from the individual unit pixels 21. In addition, the C-MOS image sensor 110 includes n horizontal selection lines 23 (23-1, 23-2, ..., 23-n) connected to m unit pixels 21 arranged in the horizontal direction and a horizontal address selection circuit 24 for supplying selection signals to the n horizontal selection lines 23.

The C-MOS image sensor 110 includes four column amplifiers 25 (25-1, 25-2, 25-3, 25-4), m column selection switches 26 (26-1, 26-2, ..., 26-m) connected to the individual column signal lines 22, a vertical address selection circuit 27, and four analog/digital (A/D) converters connected to output terminals of the individual column amplifiers 25.

The m column signal lines 22, which are grouped into sets of a number of lines (four lines) corresponding to the column amplifiers 25, are individually connected through corresponding column selection switches 26 to corresponding column amplifiers 25. That is, among the sets of four lines, the first column signal lines 22 (22-1, 22-5, ..., 25-(n-3)) are connected to the column amplifier 25-1 through the corresponding column selection switches 26. The second column signal lines 22 (22-2, 22-6, ..., 25-(n-2)) are connected to the column amplifier 25-2 through the corresponding column selection switches 26. The third column signal lines 22 (22-3, 22-7, ..., 25-(n-1)) are connected to the column amplifier 25-3 through the corresponding column selection switches 26. The fourth column signal lines 22 (22-4, 22-8, ..., 25-n) are connected to the column amplifier 25-4 through the corresponding column selection switches 26.

The vertical address selection circuit 27 generates column selection signals for turning on and off the column selection switches 26. The vertical address selection circuit 27 controls, for each set constituted by four column signal lines 22, turning on and off of the column selection switches 26. When a column selection switch 26 is turned on, electric signals output from the unit pixels 21 connected to the column signal line 22 are supplied to a corresponding column amplifier 25.

A/D converters 28 digitize electric signals amplified by the column amplifiers 25 and output 10-bit pixel data per pixel. In addition, the output terminal of each of the A/D converters 28 is connected to the data output section 120 via a total of ten signal lines corresponding to individual bit data items constituting pixel data. For example, at each of the timings when a pulse signal based on the reference clock CLK0 rises and falls, 1-bit data is output.

In addition, concerning the C-MOS image sensor 110, the operating frequency of the reference clock CLK0 supplied from the system controller 400 is different according to the image pickup mode, as described above. Thus, the C-MOS image sensor 110 outputs pixel data at fast timings in a case where an image pickup mode at a high pixel rate is selected and outputs pixel data at slow timings in a case where an image pickup mode at a slow pixel rate is selected.

Figure 4:
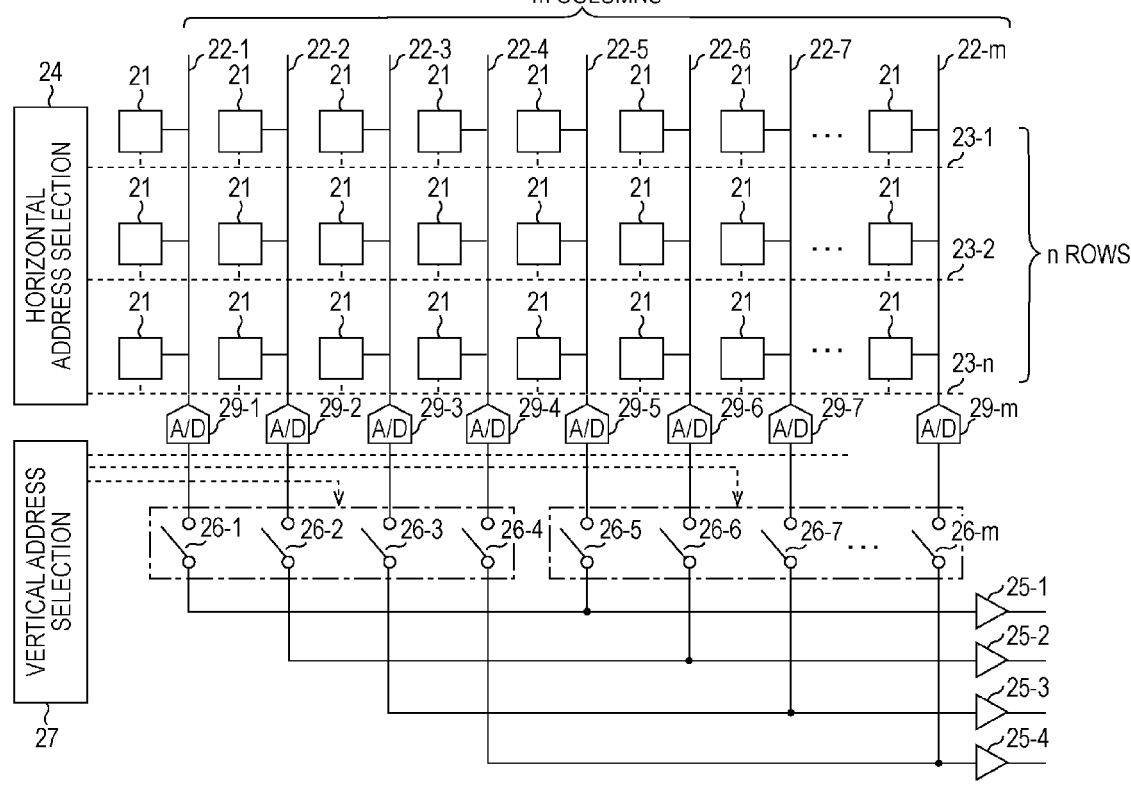
FIG. 4 is an illustration showing a circuit board of a C-MOS image sensor.

Note that as shown in FIG. 4, A/D converters 29 may be inserted in the individual column signal lines 22 so that a C-MOS image sensor 110 that directly outputs digitized pixel data from the column signal lines 22 can be used. Alternatively, the C-MOS image sensor 110 may output 1-bit data at every timing when a pulse signal based on the reference clock CLK0 rises.

As described above, the C-MOS image sensor 110 captures an image of a subject and supplies four parallel pixel data items per unit time through a total of forty signal lines to the data output section 120.

Figure 5:
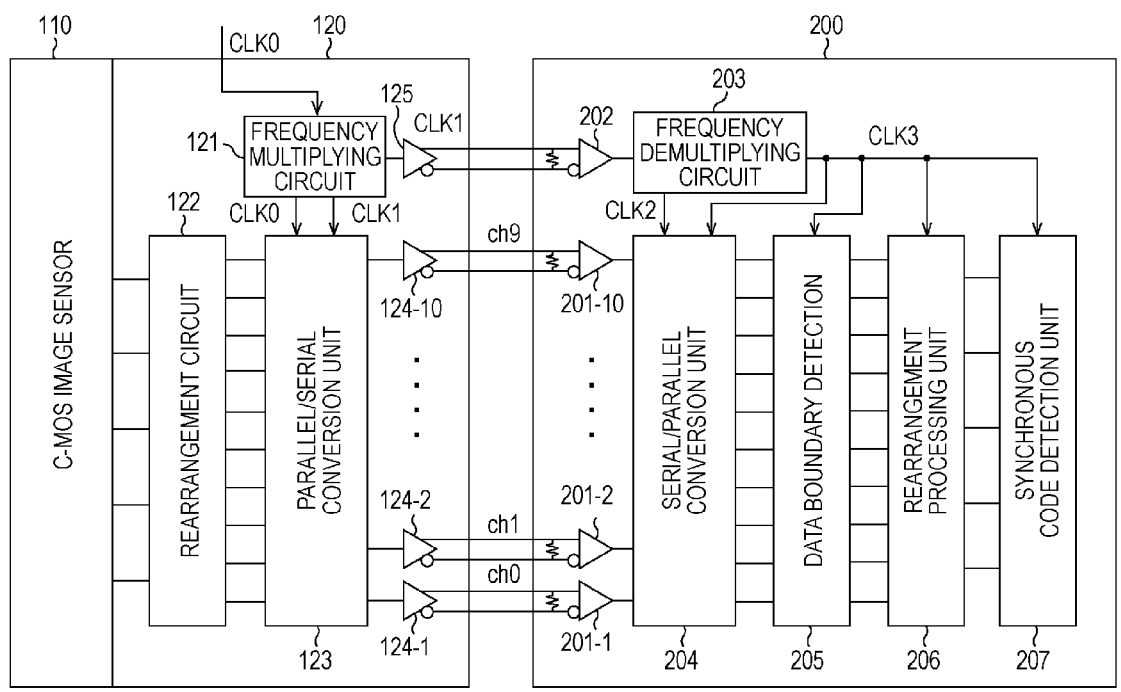
FIG. 5 is a schematic diagram showing the configurations of an image pickup device and an image processing device.

Next, the configurations of the data output section 120 and the image processing device 200 will be described with reference to FIG. 5.

The data output section 120 performs the data processing described below on four parallel pixel data items input from the C-MOS image sensor 110 through the total of forty signal lines, and supplies captured image data to the image processing device 200 through at most ten differential transmission channels via the output terminals. Since pixel data items are output through at most ten differential transmission channels as described above, in the data output section 120, the number of output terminals for outputting data to the outside of the solid-state image pickup device 100 is reduced. In accordance with this, the number of signal lines allowing connection between the solid-state image pickup device 100 and the image processing device 200 is reduced. Compared with a case where a total of forty signal lines are directly connected from the image pickup device 100 to the image processing device 200, the circuit scale as the entire apparatus can be significantly reduced.

Specifically, the data output section 120 includes a frequency multiplying circuit 121 for generating a high-speed clock CLK1 by performing multiplication of the reference clock CLK0, a rearrangement processing unit 122 for rearranging four parallel pixel data items supplied from the C-MOS image sensor 110 into bit data sequences in a parallel format, a parallel/serial conversion unit 123 for converting the bit data sequences rearranged by the rearrangement processing unit 122 into a serial format, data transmitters 124 (124-1, 124-2, ..., 124-10) of a total of ten channels for transmitting the bit data sequences in the serial format converted by the parallel/serial conversion unit 123 to the image processing device 200, and a clock transmitter 125 for transmitting the high-speed clock CLK1 generated by the frequency multiplying circuit 121 to the image processing device 200.

Here, each of the data transmitters 124 (124-1, 124-2, ..., 124-10) and the clock transmitter 125 are differential amplifiers and are connected to the image processing device 200 through differential transmission channels each formed by a pair of two signal lines.

Specifically, the clock transmitter 125 transmits the high-speed clock CLK1 by using two pulse signals having opposite phases. Each of the data transmitters 124 also transmits bit data by using two pulse signals having opposite phases.

The image processing device 200 includes data receivers 201 (201-1, 201-2, ..., 201-10) of a total of ten channels for receiving pulse data sequences in a serial format transmitted through differential transmission channels, a clock receiver 202 for receiving the high-speed clock CLK1 transmitted from the clock transmitter 125 of the data output section 120, a frequency demultiplying circuit 203 for generating a clock that is in synchronization with the high-speed clock CLK1 received by the clock receiver 202, a serial/parallel conversion unit 204 for converting the bit data sequences in the serial format received by the individual data receivers 201 into bit data sequences in a parallel format, a data boundary detection unit 205 for detecting the boundary of individual pixel data items from the bit data sequences in the parallel format, a rearrangement processing unit 206 for forming pixel data from captured image data on the basis of the boundary detected by the data boundary detection unit 205, and a synchronous code detection unit 207 for detecting synchronous code contained in the pixel data formed by the rearrangement processing unit 206.

Here, the data receivers 201 and the clock receiver 202 are differential amplifiers. The data receivers 201 and the clock receiver 202 receive bit data expressed by pulse signals transmitted from the data transmitters 124 and the clock transmitter 125 of the data output section 120, respectively.

In addition, in a case where captured image data is transmitted from the image pickup device 100 through differential transmission channels to the image processing device 200, the influence of common mode noise is less likely to be received, compared with a single transmission method. Thus, in a differential transmission method, even if the amplitude of a signal is reduced, data can be transmitted reliably compared with the single transmission method. Therefore, by the amount corresponding to a reduction in the amount of signal components compared with a case where captured image data is transmitted in the single transmission method, the data output section 120 can increase the data transmission speed. Since the increase in the data transmission speed can be achieved as described above, bit data can be transmitted on the basis of the high-speed clock CLK1, which is generated by the frequency multiplying circuit 121.

Figure 6:
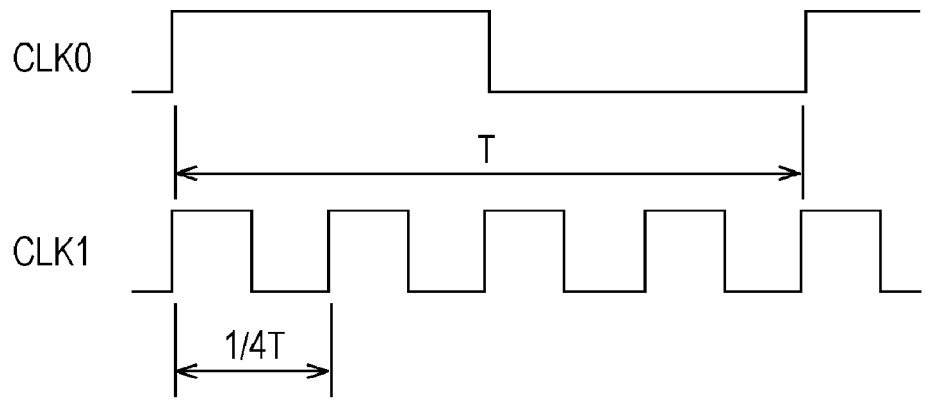
FIG. 6 is an illustration showing a reference clock CLK0 and a high-speed clock CLK1.

Here, as shown in FIG. 6, the high-speed clock CLK1 is obtained by multiplying a pulse interval T of the reference clock CLK0 by ¼ and is in synchronization with the reference clock CLK0. The high-speed clock CLK1 is supplied to each of the parallel/serial conversion unit 123 and the clock transmitter 125.

In addition, the high-speed clock CLK1 is transmitted from the clock transmitter 125 through a differential transmission channel to the clock receiver 202 of the image processing device 200. The frequency demultiplying circuit 203 demultiplies the high-speed clock CLK1 received by the clock receiver 202 to generate a high-speed clock CLK2 and a low-speed clock CLK3 that are in synchronization with the high-speed clock CLK1 and the reference clock CLK0, respectively, and supplies the high-speed clock CLK2 and the low-speed clock CLK3 to each processing unit. Here, the high-speed clock CLK2 is obtained by multiplying a pulse interval of the low-speed clock CLK3 by ¼. As described above, in the image processing device 200, synchronization with respect to the image pickup device 100 can be achieved on the basis of the high-speed clock CLK2 and the low-speed clock CLK3.

Furthermore, in response to a control instruction supplied from the system controller 400, the data output section 120 selects the number of channels to be used for output terminals, that is, data transmitters 124 supplied with electric power to be driven, in accordance with an image pickup mode. Similarly, the image processing device 200 also selects data receivers 201 supplied with electric power to be driven, in accordance with the image pickup mode. As described above, operations of the data output section 120 and the image processing device 200 change in accordance with the image pickup mode.

Then, a specific operation of each processing unit of the data output section 120 and the image processing device 200 will be described. Hereinafter, among the total of four types of image pickup modes shown in FIGS. 2A and 2B, three types of image pickup modes, the still-image recording mode (432 [M Pixel/s]), the HD moving-image recording mode (108 [M Pixel/s]), and the monitoring mode (27 [M Pixel/s]), are taken as specific examples. First, by setting an image pickup mode to the still-image recording mode (432 [M Pixel/s]), an operation of each processing unit of the data output section 120 and the image processing device 200 will be described in detail.

The rearrangement processing unit 122 transposes four parallel pixel data items supplied from the C-MOS image sensor 110 into ten parallel bit data sequences.

Figure 7:
FIG. 7 is an illustration showing differential transmission processing for bit data in a still-image image pickup mode.

For example, as shown in FIG. 7, in a case where four parallel pixel data items are defined as a first pixel data item (D1[1],D1[2], ..., D1[10]), a second pixel data item (D2[1], D2[2], ..., D2[10]), a third pixel data item (D3[1], D3[2], ..., D3[10]), and a fourth pixel data item (D4[1],D4[2], ..., D4[10]), the rearrangement processing unit 122 transposes the four parallel pixel data items into a first bit data sequence (D1[1], D2[1], D3[1], D4[1]), a second bit data sequence (D1[2], D2[2], D3[2], D4[2]), and a tenth bit data sequence (D1[10], D2[10], D3[10], D4[10]). Here, the rearrangement processing unit 122 performs processing for transposing four parallel pixel data items into ten parallel bit data sequences at each of the timings when a pulse signal based on the reference clock CLK0 rises and falls. In addition, the bit data sequences are supplied from the rearrangement processing unit 122 to the parallel/serial conversion unit 123.

The parallel/serial conversion unit 123 assigns individual bit data sequences to the data transmitters 124 corresponding to individual channels, as shown in FIGS. 8A and 8B. Then, the data transmitter 124 of each channel outputs data, on a bit-by-bit basis, at each of the timings when a pulse signal based on the high-speed clock CLK1 rises and falls. For example, the first bit data sequence is output from the transmitter 124-1 in the order of D1[1], D2[1], D3[1], and D4[1] at individual timings when a pulse signal based on the high-speed clock CLK1 rises and falls. That is, concerning the entire data transmitters 124 for ten channels, pixel data for one pixel is output at each of the timings when a pulse signal based on the high-speed clock CLK1 rises and falls.

Bit data items output from each of the data transmitters 124 are transmitted through a differential transmission channel to a corresponding data receiver 201 of the image processing device 200. The serial/parallel conversion unit 204 detects bit data items from a pulse signal transmitted to each of the data receivers 201 in accordance with each of the timings when a pulse signal based on the high-speed clock CLK2 rises and falls. Furthermore, the serial/parallel conversion unit 204 supplies a plurality of bit data items read from each of the data receivers 201 as a bit data sequence to the data boundary detection unit 205 at each of the timings when a pulse signal based on the low-speed clock CLK3 rises and falls. Here, since the low-speed clock CLK3 corresponds to four periods of the high-speed clock CLK2, the serial/parallel conversion unit 204 supplies, to the data boundary detection unit 205, a total of ten bit data sequences in which each sequence is constituted by four bits.

The data boundary detection unit 205 detects the least significant bit and the most significant bit of each pixel data item from bit data sequences supplied from the serial/parallel conversion unit 204 at each of the timings when a pulse signal based on the low-speed clock CLK3 rises and falls, and supplies the bit data sequences including detection results added thereto to the rearrangement processing unit 206.

The rearrangement processing unit 206 generates extended 14-bit length pixel data per pixel from the bit data sequences supplied from the data boundary detection unit 205 at each of the timings when a pulse signal based on the low-speed clock CLK3 rises and falls, and supplies the pixel data to the synchronous code detection unit 207.

The synchronous code detection unit 207 detects synchronous code from each pixel data item supplied from the rearrangement processing unit 206 at each of the timings when a pulse signal based on the low-speed clock CLK3 rises and falls. By this synchronization processing, synchronization can be achieved among a plurality of pixel data items constituting a screen.

Then, in the image processing device 200, captured image data in which synchronization can be achieved among pixel data items per screen is stored in units of screens in the memory.

As described above, in a case where image pickup is carried out in the still-image image pickup mode, in the video camera 1 according to this embodiment, electric power is supplied to ten differential transmission channels so that the ten differential transmission channels are driven, and captured image data is supplied from the solid-state image pickup device 100 to the image processing device 200 at a data rate of 432 [M bps] per channel, similarly to the conventional video camera.

Next, processing for transmitting captured image data in a case where an image pickup mode is set to the HD moving-image recording mode will be described with reference to FIGS. 8A and 8B. Note that the description of the data output section 120 and the image processing device 200 regarding processing similar to that in the still-image image pickup mode will be omitted.

In a case where the image pickup mode is set to the HD moving-image recording mode, the rearrangement processing unit 122 of the data output section 120 transposes four parallel pixel data items supplied from the C-MOS image sensor 110 into five parallel bit data sequences each having eight bits.

Specifically, concerning the five parallel bit data sequences, the pixel data items are transposed into a first bit data sequence (D1[1], D1[2], D2[1], D2[2], D3[1], D3[2], D4[1], D4[2]), a second bit data sequence (D1[3], D1[4], D2[3], D2[4], D3[3], D3[4], D4[3], D4[4]), . . . , and a fifth bit data sequence (D1[9], D1[10], D2[9], D2[10], D3[9], D3[10], D4[9], D4[10]), as shown in FIG. 8A. Then, the five parallel bit data sequences are transmitted through five differential transmission channels to the image processing device 200.

As described above, in a case where image pickup is carried out in the HD moving-image recording mode, as shown in FIGS. 2A and 2B, electric power is supplied to five differential transmission channels, and captured image data is supplied from the solid-state image pickup device 100 to the image processing device 200 at a data rate of 216 [M bps] per channel.

Meanwhile, in the conventional video camera, as shown in FIG. 8B, all the ten differential transmission channels are driven and captured image data is supplied from the solid-state image pickup device 100 to the image processing device 200 at a data rate of 108 [M bps] per channel.

Thus, in the data output section 120 and the image processing device 200 according to this embodiment, compared with the conventional video camera shown in FIG. 9B, captured image data is transmitted at a double-speed bit rate per channel.

Next, processing for transmitting captured image data in a case where an image pickup mode is set to the monitoring mode will be described with reference to FIGS. 9A and 9B.

In the video camera 1 according to this embodiment, as shown in FIG. 9A, four parallel pixel data items supplied from the C-MOS image sensor 110 are transposed into one bit data sequence by the rearrangement processing unit 122, and the one bit data sequence is transmitted through one differential transmission channel to the image processing device 200. That is, in a case where the image pickup mode is set to the monitoring mode, electric power is supplied to only one differential transmission channel.

As described above, in a case where image pickup is carried out in the monitoring mode, as shown in FIGS. 2A and 2B, one differential transmission channel is driven, and captured image data is supplied from the solid-state image pickup device 100 to the image processing device 200 at a data rate of 270 [M bps] per channel.

Meanwhile, in the conventional video camera, as described above, captured image data is transmitted by using all the ten differential transmission channels. Specifically, in the conventional video camera, as shown in FIG. 9B, compared with a case where the video camera operates in other image pickup modes, a bit rate per channel is slow.

Incidentally, since differential transmission systems in which input/output terminals serve as differential amplifiers perform constant-current transmission, only a negligible change occurs in electric power consumption of the differential transmission systems in accordance with a transmission frequency. However, the electric power consumption of the differential transmission systems increases in proportion to the number of differential transmission channels used.

Here, in the still-image recording mode, both the conventional video camera and the video camera 1 according to this embodiment use ten differential transmission channels. Thus, electric power consumed by the video camera 1 according to this embodiment at the time of differential transmission of captured image data is equivalent to that in a conventional transmission method. That is, in a case where the pixel rate of captured image data is fast, there is a limitation in the transmission rate per channel and transmission processing is similarly performed by using all the differential transmission channels. Thus, compared with the conventional video camera, there is only a negligible difference in the amount of electric power consumption of the differential transmission systems.

Meanwhile, in the HD moving-image recording mode, the conventional video camera uses ten differential transmission channels, whereas the video camera 1 according to this embodiment uses five differential transmission channels. Thus, the video camera 1 according to this embodiment can reduce the electric power consumed by the differential transmission systems to almost half of that of the conventional video camera.

Similarly, in the monitoring mode, the video camera 1 according to this embodiment can reduce the electric power consumed by the differential transmission systems to about one tenth of that of the conventional video camera.

As described above, the video camera 1 according to this embodiment drives the differential transmission systems for individual channels in such a manner that data is transmitted at a higher bit rate, irrespective of the image pickup mode, and captured image data is transmitted. In addition, the video camera 1 according to this embodiment transmits captured image data by using differential transmission channels, the number of which is proportional to the pixel rate. Thus, the video camera 1 can reduce the number of differential transmission channels to be driven and achieve a reduction in the electric power consumption in a case where captured image data at a low pixel rate is transmitted.

As described above, since the video camera 1 transmits captured image data through differential transmission channels, the video camera 1 can reduce unnecessary radiation occurring at the time when data is transmitted. In addition, since the video camera 1 drives a minimum necessary number of differential amplifiers in accordance with the image quality of image data, captured image data can be transmitted with reduced electric power, irrespective of the image quality of captured image data to be transmitted.

Note that the present invention is not limited to only the above-described embodiment. Obviously, various changes can be made without departing from the gist of the present invention. Specifically, although the differential transmission systems for transmitting pixel data from the image pickup device 100 to the image processing device 200 are ten differential transmission channels in the above-described embodiment, the number of channels is not limited to this. In addition, although the high-speed clocks CLK1 and CLK2 in this embodiment are obtained by multiplying the operating frequency of a reference clock by four, the high-speed clocks CLK1 and CLk2 are not limited to this.

The invention claimed is:

1. A solid-state image pickup device comprising:
a solid-state image pickup element that reads, on the basis of a first clock, captured image data items from a plurality of unit pixels that are arranged two-dimensionally;
a second clock generation unit that generates a second clock having an operating frequency higher than that of the first clock;
an arrangement processing unit that rearranges the captured image data items read from the solid-state image pickup element into bit data sequences;
a data transmission unit that includes a first number of differential amplifiers for transmitting the bit data sequences rearranged by the arrangement processing unit through a plurality of differential transmission channels to the outside, the differential amplifiers transmitting the bit data sequences to the outside on the basis of the second clock; and
a control unit that drives a second number of the differential amplifiers, the second number being different from the first number.

2. The solid-state image pickup device according to claim 1, wherein the second clock generation unit generates the second clock, which is obtained by multiplication of the operating frequency of the first clock.

3. The solid-state image pickup device according to claim 1, wherein the solid-state image pickup element reads pixel data items in a plurality of columns per unit time on the basis of the first clock, and the arrangement processing unit rearranges the pixel data items in the plurality of columns into the bit data sequences.

4. A data transmission method comprising:
providing a first number of differential amplifiers for transmitting captured image data items to an outside, the captured image data items being read from a solid-state image pickup element on the basis of a first clock, the solid-state image pickup element comprising a plurality of unit pixels arranged two-dimensionally;
rearranging the captured image data items read from the solid-state image pickup element into a predetermined number of bit data sequences;
generating a second clock having an operating frequency higher than that of the first clock;
driving a second number of the differential amplifiers, the second number being different from the first number; and
transmitting the rearranged bit data sequences to the outside on the basis of the second clock.

5. The method according to claim 4, further comprising:
providing a first number of differential transmission channels, wherein the rearranged bit data sequences are transmitted through a second number of the differential transmission channels less than the first number of the differential transmission channels.

6. An image pickup apparatus comprising
an image pickup processing section that reads, on the basis of a first clock, captured image data items from a solid-state image pickup element in which unit pixels are arranged two-dimensionally, and
an image processing section that performs predetermined data processing on the captured image data items read from the image pickup processing section, wherein the image pickup processing section includes:
a second clock generation unit that generates a second clock having an operating frequency higher than that of the first clock, an arrangement processing unit that rearranges the captured image data items read from the solid-state image pickup element into a predetermined number of bit data sequences, a data transmission unit that includes a first number of differential amplifiers for transmitting the bit data sequences rearranged by the arrangement processing unit to the outside, the differential amplifiers transmitting the bit data sequences to the outside on the basis of the second clock, and a control unit that drives a second number of differential amplifiers, the second number being different from the first number.

7. The image pickup apparatus according to claim 6, further comprising:

a first number of differential transmission channels connecting the image pickup processing section and the image processing section, wherein the bit data sequences are transmitted by the second number of differential amplifiers through a second number of differential transmission channels less than the first number of the differential transmission channels.

* * * * *